United States Patent [19]

Hofmann

[11] Patent Number: 4,747,574
[45] Date of Patent: May 31, 1988

[54] APPARATUS FOR ACQUISITION OF THE SURFACE SHAPE OF A DISTANT OBJECT BY MEANS OF PICTURE ELEMENT SCANNING

[75] Inventor: Otto Hofmann, Kirchstockach, Fed. Rep. of Germany

[73] Assignee: Messerschmitt-Bölkow-Blohm GmbH, Munich, Fed. Rep. of Germany

[21] Appl. No.: 863,703

[22] Filed: May 15, 1986

[30] Foreign Application Priority Data

May 15, 1985 [DE] Fed. Rep. of Germany ....... 3517671

[51] Int. Cl.$^4$ .............................................. H01J 3/14
[52] U.S. Cl. .................................. 250/234; 250/235; 350/6.4; 356/376
[58] Field of Search ............... 250/234, 235, 236, 558; 350/6.4, 6.7, 6.8; 356/376, 12

[56] References Cited

U.S. PATENT DOCUMENTS 3,967,109 6/1976 Amos et al. ........................ 250/235
4,424,442 1/1984 Kitamura ............................ 250/236

Primary Examiner—Edward P. Westin
Assistant Examiner—Khaled Shami
Attorney, Agent, or Firm—Toren, McGeady & Associates

[57] ABSTRACT

In the disclosed device, a lens arrangement focuses light upon a detecting sensor arrangement as a vehicle passes over an object, such as the ground, whose surface is to be determined. An optical device slews the path of light to the lens arrangement from left to right relative to the direction of vehicle movement. In one embodiment, a four-part prism rotating on an axis along the direction of vehicle movement passes light through three lenses angled down, for, and aft the vertical and separate radiation detectors simultaneously sense radiation from the earth's surface. In another embodiment, a rotating hexagonal prism has outer reflecting surfaces skewed normal, for, and aft, so that a single lens views sequential signals and applies them to a radiation detector. The signals are sampled, held, digitally converted, recorded, and stored.

9 Claims, 3 Drawing Sheets

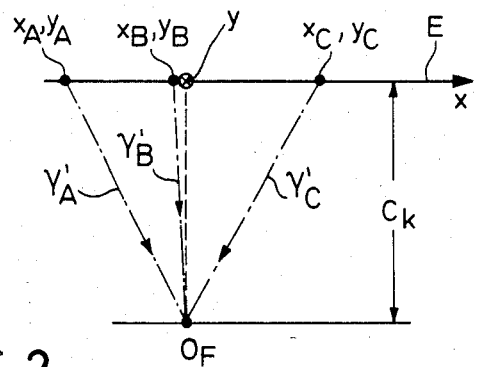
FIG. 2
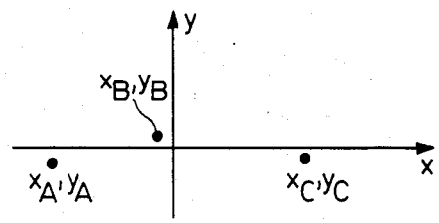
FIG. 3
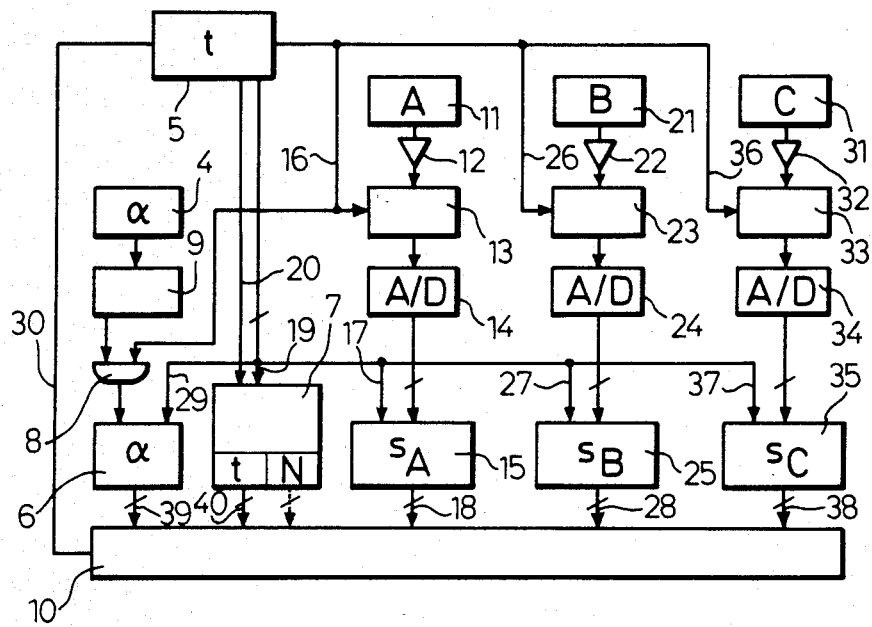

APPARATUS FOR ACQUISITION OF THE SURFACE SHAPE OF A DISTANT OBJECT BY MEANS OF PICTURE ELEMENT SCANNING

BACKGROUND OF THE INVENTION

The invention relates to an apparatus for the acquisition of the surface shape of a distant object by means of picture element scanning with at least one optomechanical scanner which moves relative to the surface of the object.

Such an apparatus is disclosed in *Bildmessung und Luftbildwesen*, 51 (1983), part 3, pages 103 to 117, which is concerned with plotting the earth's surface from aircraft or satellites. Pages 112 ff of this text describes an optomechanical scanner composed substantially of a lens, a radiation detector arranged in the focal plane of the latter, as well as a rotatable optical element located in front of the lens toward the object. The optical element is in the form of a reflector swiveling about a rotational axis parallel to the flight direction with its reflector surface inclined relative to the latter. The radiation detector is arranged along the optical axis of the lens on its image side. Its "viewing" direction extends along the optical axis toward the object up to the reflector surface of the swiveling reflector. A motor rotates the latter so that the viewing direction periodically and repeatedly swivels transversely relative to the flight direction. As a result, surface elements of the earth's surface are imaged one after the other in successive scanning traces on the radiation detector. The latter can thus measure the corresponding radiation values. Such an apparatus cannot acquire data concerning the three-dimensional surface shape of a distant object, in this case the earth's surface.

Such a spatial acquisition is possible, however, with apparatuses and methods which are described in DE-PS 29 40 741, DE-PS 30 43 577 and DE-OS 32 19 032. These apparatuses make it possible to scan an object, e.g. a portion of terrain, with a trilinear scanning camera, to access the three-dimensional shape of the object and to determine the orientation parameters of the camera (position and angle of inclination) along the relative movement between the scanner and the object.

In this case, high-resolution, rectilinear semiconductor sensors such as CCD-sensors are provided for the scanning. The semiconductors sensors contain a multiplicity of individual radiation detectors in a sensor line in each instance. The apparatus scans the entire line simultaneously in each instance with a line cycle or integration interval according to the so-called "pushbroom principle". Three linear semiconductor sensors are arranged transversely relative to the flight direction. The device and its respective evaluating method are designated in the literature, as well as the following as the DPS-evaluating method (DPS=digital photogrammetry system). Principles of the DPS-evaluating method are described, for example, in Photogrammetric Engineering and Remote Sensing, vol. 50, No. 8, August 1984, pages 1135 to 1142. The method is based on the scanning of an object with a trilinear scanner in which three linear sensor lines arranged in the focal plane of a camera at a given distance from one another and transverse relative to the flight direction, scan the object line-by-line from different viewing angles and accordingly produce three picture strips of various perspectives. Evaluation involves first determining the homologous, image points of the same object point in these three image strips and the respective three picture taking times and the assigned picture coordinates to correlation. After that an analytical evaluating process determines the orientation parameters of the camera along the flight path, as well as the three-dimensional object coordinates of the correlated picture elements.

The DPS system, particularly its evaluating method, is distinguished by the three sensor lines arranged in the focal plane of the camera forming a planar central perspective in each instance, with the objective as a center point and the respective scanning trace in the terrain to the time t of the line scan that simultaneously detects the picture elements of the three entire lines. This planar center perspective is a prerequisite, and is taken as the basis of the evaluating method of the DPS system. Therefore, it could previously not be assumed that this evaluating method could also be used without meeting the prerequisite of the planar center perspective.

The CCD sensors used in the DPS system are usually sensitive in the spectral region of 0.4 $\mu$m to 1 $\mu$m. Productions of such sensors for other wavelengths, for example, the infrared region or even microwaves encounters considerable technical difficulties or is impossible. The use of the DPS method is therefore practically limited to the wavelength region of 0.4 $\mu$m to 1 $\mu$m because of the limited spectral region of CCD sensors. Therefore, three-dimensional acquisition of the object surface was also previously possible only in this wavelength region. For other spectral regions, particularly the infrared region, the aforementioned optomechanical scanner was used, but a three-dimensional acquisition of the object surface was not attainable in this manner.

SUMMARY OF THE INVENTION

An object of the invention is to improve apparatuses of this type.

Another object of the invention is to make available an apparatus of the type mentioned which enables accurate spatial acquisition of the surface shape of distant objects accompanied using optomechanical scanners so that wavelengths which are not accessible by CCD sensors can also be utilized for three-dimensional acquisition.

According to the invention, these objects are attained in an apparatus containing one or more optomechanical scanners which produce at least three scanning trace sequences each with different perspectives, one sequence being of middle scanning traces, and at least one sequence each of front and back scanning traces with forward looking or rearward looking perspective relative to the middle scanning trace sequence with reference to the direction of the relative movement; an angular position generator for each rotatable optical element for measuring such continuously varying rotational angle; and a device for synchronously recording, in presettable time intervals, the instantaneous rotational angles $\alpha$ supplied by the angle sensors, the radiation values s of the elements of the object surface as measured by the radiation detectors, and the respective time t.

In such an apparatus, three picture strips, which correspond to three sequences of scanning traces of different perspectives, can now be taken of the object surface with the use of optomechanical scanners. The apparatus thus makes it possible to use the DPS system's evaluating method. This is the case even though the planar central perspective available in trilinear CCD cameras is no longer available with optomechanical scanners. Rather, in this case, the picture elements of a scanning trace are acquired one after the other in time, rather than simultaneously, since only one radiation detector is available, instead of a sensor line, and the surface elements of a scanning trace are imaged one after the other on the radiation detector because of the mechanical rotational movement of the rotatable optical element. The scanning trace occurring on the object surface is also no longer a straight line when the object surface is completely planar because of the forward movement of the airborne device carrying the scanner. Rather, in this case, a line which swings slightly along an S-shaped path results as scanning trace. The scanning trace, the radiation detector and its lens thus no longer lie in a plane, i.e., the planar central perspective required by the DPS evaluating method is lost when optomechanical scanners are used.

Nevertheless, in the apparatus according to the invention, other requirements must be met to make this evaluating method feasible. It is essential that the rotational angles which are measured by the angle sensors and arise from the assigned rotatable optical elements, e.g., a swiveling reflector or rotating prism, and the radiation values measured by the radiation detectors, as well as the respective times, be synchronously recorded in a presettable time rhythm or sequence as respective value groups for each picture element. This is specifically so for all three sequences of scanning traces of respectively different perspectives. Surprisingly, it is in principle unimportant onto which surface areas the rotatable optical elements move the object-side viewing directions of the radiation detectors. It is important only that the spatial or three-dimensional viewing direction can be determined at any time with reference to the camera coordinate system to be assigned to the optomechanical scanner. As the evaluation proceeds, it is advisable to convert the instantaneous viewing direction, which first follows from the measured rotational angle $\alpha$, into hypothetical or fictitious picture coordinates with reference to the camera coordinate system.

These and other features of the invention are pointed out in the claims. Other objects and advantages of the invention will become evident from the following detailed description of when read in light of the accompanying drawings.

BRIEF DESCRIPTION OF THE DRAWINGS

FIG. 2 is a diagram of the allocation of a convergence angle, which represents the different perspectives or viewing directions of the radiation detectors to corresponding fictitious picture coordinates, according to the invention.

FIG. 3 is a block diagram of an apparatus embodying the invention.

DESCRIPTION OF THE PREFERRED EMBODIMENTS

Figure 1A:
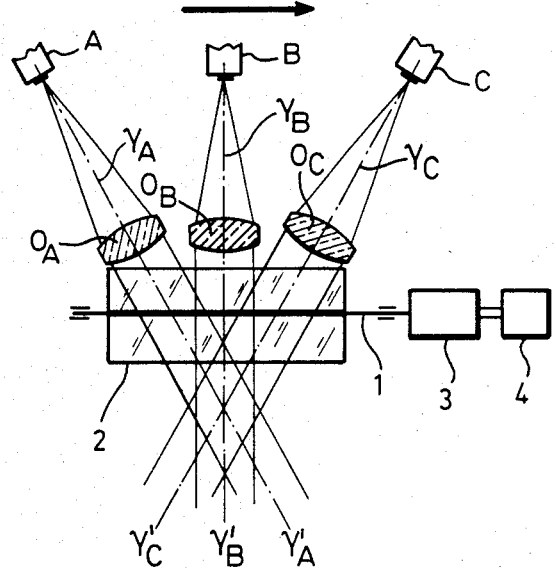
FIG. 1a shows a side view of a scanner embodying the invention and having a rotating prism and three lenses and radiation detectors.

In FIG. 1a, an axle 1 rotates a four-part or four-section rotatable prism 2, which is square in cross-section to deflect light coming to three optical systems S1, S2, and S3 that operate with the prism. In the system S1, a lens $O_A$ focuses light or other radiation onto a radiation detector A; in system S2, a lens $O_b$ focuses light or other radiation onto a radiation detector B; and in system S3, a lens $O_C$ focuses light onto a radiation detector C.

Three optical systems are used because, according to the invention, the scanners used must make it possible either by virtue of their number or their special construction to perform at least three sequences of scanning traces at different perspectives or viewing directions. Preferably, the number of scanning traces performed is three.

The viewing direction of the three radiation sensors A, B, and C are first established by the optical axes of the corresponding lenses $O_A$, $O_B$, and $O_C$. The radiation detectors A, B, and C each lie on the optical axes of the corresponding lenses $O_A$, $O_B$, and $O_C$ at the respective focal planes. In FIG. 1a and in the following, the viewing directions are designated as so-called convergence directions $\gamma_A$, $\gamma_B$, $\gamma_C$. The latter refer to the camera coordinate system.

The axle 1 turns the rotating prism 2. For simplicity, the axis about which the axle 1 and the prism 2 turn is also identified as axis 1. The axis 1 extends in the direction of the relative movement between the scanner and the object surface, that is, substantially along the flight direction of the airborne device carrying the scanner. A motor 3 drives the axle 1 to rotate the prism 2 at a uniform rate. An angle sensor 4 connected to the axle 1 which drives the prism 2 measures the rotational angle of the alxe 1 and the rotating prism 2.

Figure 1B:
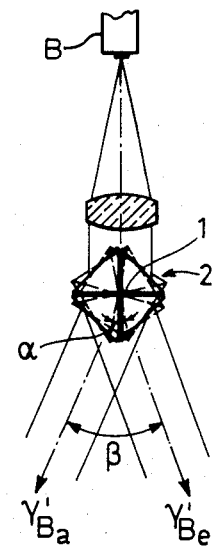
FIG. 1b is a section of the scanner in FIG. 1a, perpendicular to the rotational axis.

FIG. 1b is a section b—b passing through the middle optical system S2 of FIG. 1a. Here, the rotating prism 2 between the lens $O_B$ and the object, i.e., the terrain, swivels the viewing direction of the radiation detector B and the lens $O_B$ transversely to the direction of the rotational axis 1 of the rotating prism 2. The four-part rotating prism effects a quadruple sweep of the viewing direction of the radiation detector B for each rotation of the prism 2. Hence, with the detection B, the arrangement runs through four scanning traces, one following for each rotation of the prism 2. Similarly, the viewing directions of the lenses $O_a$ and $O_c$ and the detectors A and C of the systems S1 and S3 also pass through the prism 2. Hence, the arrangement runs through four scanning traces, one following the other, with each of the radiation detectors A and C during each rotation of the prism 2.

As shown in FIG. 1b, the deflection $\beta$ of the viewing direction of the radiation detectors is twice as great as the actual rotational angle $\alpha$ through which the rotating prism 2 passes. This results from the reflection action of the rotating prism. Hence, each scanning trace swivels the viewing direction $\gamma'_B$ of the radiation detector B between the lens $O_B$ and thus swivels the object between an initial value $\gamma'_{Ba}$ and $\gamma'_{Be}$. The function and manner of the operation of a four-part rotating prism is described, for example, in German Patent Publication DE-OS 21 21 918.

Figure 1C:
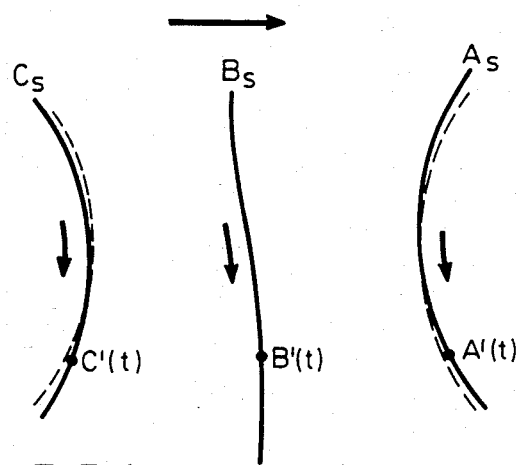
FIG. 1c shows the scanning traces produced by the scanner of FIGS. 1a, 1b on flat terrain.

The forward motion of the airborne device carrying the scanner prevents the scanning trace $B_s$ of the radiation detector B from producing a straight line on the object surface which is assumed for simplicity to be planar or flat. Rather, as shown in FIG. 1c, the line or trace swings slightly in an approximately S-shaped manner. The surface elements B'(t) lying on this sweep are temporarily imaged in sequence on the radiation detector B to permit recording the corresponding radiation values. The scanning traces of the radiation detectors A or C, which are directed forward or rearward with reference to the flight direction likewise appear in FIG. 1c as arcs $A_s$ and $C_s$. The prism 2 swivels the viewing directions which the lenses $O_A$ and $O_C$ impose on the radiation detectors A and C along conic sections. Hence, approximately hyperbolic scanning traces $A_s$ and $C_s$ result on a flat object surface as shown in FIG. 1c. For comparison, the dashed lines DL in FIG. 1c represent purely hyperbolic lines.

Each angular position $\alpha$ of the rotating prism 2 and each point in time t define three unequivocal spatial or three-dimensional directions $\gamma'_A$, $\gamma'_B$ and $\gamma'_C$ which correspond to the instantaneous viewing directions or perspectives of the three radiation detectors A, B, and C and which in each instance occur in the radiation path between the object and the rotating prism 2. In each instance, these spatial directions can be expressed by means of two angular components $\phi'_A$ and $\omega'_A$, $\phi'_B$ and $\omega'_B$, as well as $\phi'_C$ and $\omega'_C$ (for example, as rotations around the x and y axes of FIG. 2) with reference to a coordinate system which is fixed in relation to the camera. The three viewing directions $\gamma'_A$, $\gamma'_B$, $\gamma'_C$ and their respective angular components, can be seen as functions F and G of the constant convergence angle $\gamma_A$, $\gamma_B$, $\gamma_C$, of the lenses $O_A$, $O_B$, and $O_C$ and of the rotational angle $\alpha$ which varies in time with the rotation of the rotating prism 2. These functions can be measured directly or also derived empirically by means of calibration measurements, e.g. with a revolving turntable or theodolites, i.e., universal surveying instruments. The components are:

$$\phi'_A = F_A(\alpha, \gamma_A) \qquad (1)$$
$$\omega'_A = G_A(\alpha, \gamma_A)$$
$$\phi'_B = F_B(\alpha, \gamma_B)$$
$$\omega'_B = G_B(\alpha, \gamma_B)$$
$$\phi'_C = F_C(\alpha, \gamma_C)$$
$$\omega'_C = G_C(\alpha, \gamma_C)$$

With the aid of a fictitious or hypothetical chamber constant or calibrated focal length $c_k$, assigned fictitious or hypothetical picture coordinates can be calculated from these angle component pairs of the time varying viewing directions of the three radiation detectors A, B, and C in a picture coordinate system common to all three lenses. The calibrated focal length $c_K$ in photogrammetry is usually a purely mathematical focal length of a lens which is selectable as desired and which need not be identical with the optophysical focal length (see, e.g. Schwidefsky, Ackermann, "Photogrammetrie, Grundlagen, Verfahren, Anwendungen", Stuttgart 1976, page 54).

In the case of the three lenses $O_A$, $O_B$, $O_C$ of FIG. 1a, the three rays corresponding to the instantaneous viewing directions $\gamma'_A$, $\gamma'_B$, $\gamma'_C$ on the side of the object are directed through a common hypothetical projection center $O_F$, according to FIG. 2. This yields the picture coordinate pairs $x_A$, $y_A$ and $x_B$, $y_B$, and $x_C$, $y_C$ as points of intersection of these fictitious rays through the focal plane on a hypothetical or hypothetical focal plane E arranged at a distance from the calibrated focal lengths $c_K$ which are selectable as desired. The camera coordinate system can be directed with respect to the real structural component parts of the scanner such that the hypothetical projection center $O_F$ coincides with the intersecting point of the extensions of the two optical axes of the lenses $O_A$ and $O_C$ on the side of the object, and the hypothetical focal plane is oriented at a desired distance $c_k$ over this hypothetical perspective center $O_F$ and normal relative to the optical axis of the middle lens $O_B$. The picture elements $x_A$, $y_A$ etc., at the bottom of the two diagrams of FIG. 2 do not lie on a straight line parallel to the x axis, since picture elements of the same object point or element are shown here which were taken at different times $t_1$, $t_2$, $t_3$, and with a different perspective viewing direction in each instance, and indeed at different camera inclinations.

The aforementioned picture coordinate pairs x, y, can generally be expressed as functions $F_x$ and $F_y$ of the angle components $\phi'$ and $\omega'$, as well as the calibrated focal lengths $c_k$:

$$x = F_x(c_k, \phi', \omega') = F'_x(c_k, \alpha, \gamma) \qquad (2)$$
$$y = F_y(c_k, \phi', \omega') = F'_y(c_k, \alpha, \gamma)$$

The picture coordinate pairs x, y are accordingly functions of the desired selected hypothetically calibrated focal lengths $c_k$, of the swiveling angle $\alpha$ and of the fixed convergence angle $\gamma$ of the optical axes of the lenses $O_A$, $O_B$, and $O_C$ on the image side. Here, aside from the fixed values $c_k$ and $\gamma$, the rotational angle $\alpha(t)$ forms the single variable.

According to the invention, the radiation values s, which belong to the consecutive points in time t and which are measured by the radiation detectors A, B, and C, are continuously determined and recorded in a presettable timewise rhythm together with the corresponding rotational angles $\alpha$ and possibly the picture element numbers N corresponding to the points in time t. The picture coordinate pairs x, and y can be calculated from Equation (2). This is required during the further evaluation according to the method of the DPS system.

FIG. 3 is a block diagram of an apparatus embodying the invention for processing the measured quantities, namely, the radiation values s and rotational angle $\alpha$. Three radiation detectors 11, 21, and 31, i.e., the radiation detectors A, B, and C of FIG. 1a, convert the incident electro-magnetic radiation intensity into amplitudes corresponding to electric voltages and convey their eletrical output signals to sample and hold circuits 13, 23, and 33 via amplifiers 12, 22, and 32 which connect the series detectors to the sample and hold circuits. A clock timing generator 5 transmits synchronizing pulses of a preselectable spacing through connecting lines 16, 26, and 36. These synchronizing pulses determine the time points t at which the measured radiation values s and rotational angle $\alpha$ are to be recorded. The output signals of the holding stages 13, 23, 33 are fed to analog-to-digital converters 14, 24, and 34, digitized, and stored in radiation value recorders 15, 25, and 35 subsequently connected serially with respect to the converters 14, 24, and 34.

In synchronism with above, the angle sensor 4 measures the rotational angles $\alpha$ of the rotating prisms 2 or other rotational optical element or elements for electronic display in an angle display 9. The periodic synchronizing pulses from the clock and time generator 5 open AND gate 8 whose other input receives the signals corresponding to the instantaneous rotational angle $\alpha$ in FIG. 3. The one AND gate symbolizes the AND gate of all the parallel lines, or the signal is transmitted in series via one AND gate. These values for the rotational angles $\alpha$ are then read into an angle position recorder 6, which is connected downstream of the AND gate 8, in synchronism with the pulses from the clock generator 5.

The clock and time generator 5 continuously adds up clock pulses in a time counter TC and in a picture element number counter PENC. At a synchronizing time t, line 20 transmits the momentary instantaneous values of the time counter TC and picture element numbers counter PENC to the time point and element numbers recorder 7.

A tape recorder, for example, forms background storage device 10. Serial or parallel data lines 39, 40, 18, 28, and 38 apply the data i.e. the rotational angle $\alpha$ from the recorder 6, the time point t and the picture element number N from recorder 7 and the three radiation values s from recorders 15, 25, and 35 to the storage device 10. The generator 5 controls the respective time points of this takeover via a control line 30 and connection lines 29, 19, 17, 27, and 37, which transmit the corresponding pulses to the recorders.

During the subsequent evaluation from the recorded rotational angle and the fictitious picture coordinates x and y assigned to the radiation values s and the time t and the picture element number N are calculated according to Equations (2). These coordinate pairs x, y of the three channels, i.e. radiation detectors 11, 21, and 31 or A, B, and C, and the assigned picture taking time t form the basis for further evaluation.

Figure 4A:
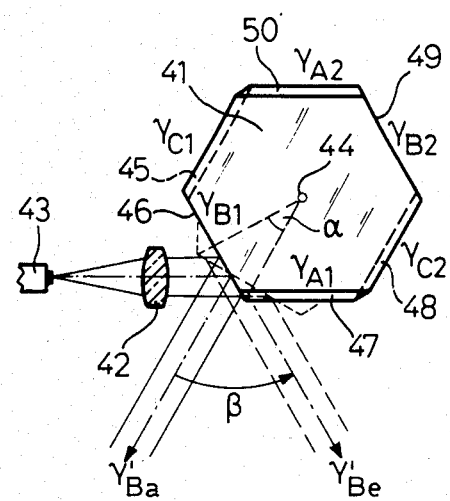
FIG. 4a shows another scanner with a reflecting prism and a lens, as well as a radiation detector, as seen along the direction of the radiation axis.

FIG. 4a shows an additional scanner, embodying the invention. The scanner contains a single rotatable optical element in the form of a reflecting prism, in turn operates with a single optical system composed of a lens 42 and a radiation detector 43. The rotational axis 44 of the reflecting prism 41 is oriented in the flight direction. In the present embodiment, the reflecting prism 41 has a total of six planar outer reflector surfaces 45 to 50. The three consecutive reflector surfaces 45, 46, and 47, as well as 48, 49, and 50, form two triad groups belonging to one another. The surface normals i.e. lines normal to the surfaces, of the middle reflector surfaces 46 and 49 are oriented vertically relative to or perpendicular to the rotational axis 44. The surface normals of the rest of the four reflector surfaces are inclined relative to this rotational axis. Specifically, each of the reflector surfaces 45 and 48 is inclined to the rear with reference to the plane of the drawing, and each of the reflector surfaces 47 and 50 is inclined forward relative to the drawing surface (literal translation). This results in a total of three different consecutive perspectives in the form of a reflecting prism per triad group as the prism rotates. The perspectives or viewing direction are consecutive in time. Thus, a number of scanning traces are not run through simultaneously. Rather, the system runs through only one of a specific viewing perspective direction at a time. When the next consecutive reflector surface enters the radiation path, the next scanning trace follows cyclically with a changed viewing direction. When the reflecting prism 41 rotates fast enough, and the scanning traces of the sequence assigned to a specific viewing direction can, without gaps, contact one another on the object surface or laterally overlap to a certain degree. Hence, the terrain surface is scanned in each instance in a continuous sequence from all three perspectives or viewing directions, and accordingly, three overlapping picture strips of different viewing directions. Reflecting prisms comprising more than two triad groups of planar outer reflector surfaces (n triad groups, n>2, n=an integer) can also be used.

Figure 4B:
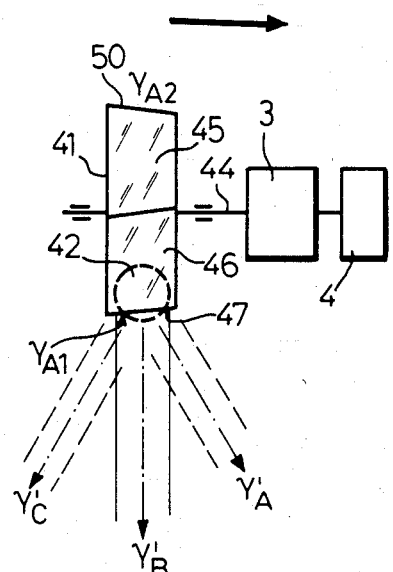
FIG. 4b shows the scanner of FIG. 4a in a side view.
Figure 4C:
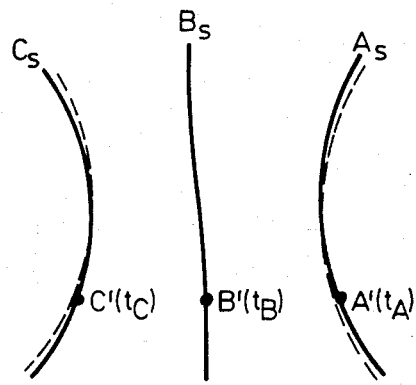
FIG. 4c shows the scanning traces of the scanner of FIGS. 4a, 4b on the flat terrain.

FIG. 4b shows a side view of the scanner shown in FIG. 4a, specifically perpendicular relative to the rotational axis 44 as seen from the side of the lens 42. The lens 42, which is shown in dashed lines in FIG. 4b, is to be thought of as lying in front of the plane of the drawing. The reflecting prism 41 is also set in rotation by a motor 3, and the respective rotational angle $\alpha$ is measured by an angle sensor 4. The three perspectives or viewing directions, namely, that looking ahead in the flight direction $\gamma'_A$, that looking down $\gamma'_B$ and that looking to the rear $\gamma'_C$, can again be clearly distinguished. The corresponding viewing directions of the radiation detector 43 are then swiveled transversely relative to the flight direction by means of the rotation of the reflecting prism 41, as shown in FIG. 4a for the case of the downward looking perspective $\gamma 40_B$. With reference to the scanner moving in the flight direction, the viewing direction corresponding to the perspective $\gamma'_B$ is swiveled in a plane which is normal relative to the flight directions. The other two viewing directions $\gamma'_A$ and $\gamma'_C$ are swiveled along on the outer contour surfaces of conic sections. The corresponding scanning traces are shown in FIG. 4c. Specifically, this is analogous to FIG. 1c for the simple case of a planar terrain surface. The three scanning traces $A_s$, $B_s$, and $C_s$ are not run through simultaneously, but, rather, consecutively, so that the three instantaneous viewing directions $A'(t_A)$, $B'(t_B)$ and $C'(t_C)$, which are characterized in FIG. 4c, occur at different points in time $t_A$, $t_B$ and $t_C$.

The block diagram, according to FIG. 3, when applied to the scanner of FIGS. 4a and 4b, is simplified in requiring only one radiation detector 43 and amplifier, holding stage, digitizer and radiation value recorder, arranged in sequence. The swivel angle $\alpha$ of the reflecting prism 41, measured by means of the angle sensor 4, clearly shows which of the reflector surfaces 45 to 50 is located directly in front of the lens 42 and which of the three perspectives is accordingly present. The statements already made above apply in an analogous manner for the calibration of the camera, the determination of the picture coordinates and the subsequent evaluation.

The aforementioned discloses a number of possible variations within the framework of the invention with respect to the quantity of scanners to be used, as well as the lenses assigned to them, and radiation detectors and rotatable optical elements. One embodiment involves providing a scanner with a rotatable optical element, for example, a rotating prism with a rotational axis oriented parallel to the direction of the relative movement. Assigned to the latter are rotatable optical element, three lenses, each with a radiation detector with an optical axis which is directed differently in each instance, and accordingly produce different perspectives or viewing directions. Another embodiment involves using three or more scanners of respectively different perspectives or optical axes, wherein each individual scanner comprises a rotatable optical element, for example, a rotating prism, with an assigned lens and radiation detector in each instance.

In both of the cases mentioned above, three sequences of scanning traces of different perspectives are taken simultaneously by means of the three optical systems composed in each instance of a lens and radiation detector. According to another embodiment, it is possible to make do with only one such optical system and only one assigned rotatable optical element, wherein only one scanning trace is always taken in each instance and every three directly consecutive scanning traces have different perspective. The perspective optical element accordingly executes rotational movements in periodic repetition, which rotational movements produce three different viewing directions one after the other in timed sequence as a result of the special construction of the rotatable optical element. For this purpose a rotatable reflecting prism can be used whose rotational axis is oriented parallel to the direction of the relative movement and which comprises 3 or 3n (n>1, n=an integer) outer reflector surfaces. The surface normals of the middle reflector surface of each three consecutive reflector surfaces is oriented perpendicularly relative to the rotational axis, and the surface normals of the two other reflector surfaces are inclined in the opposite direction in each instance with reference to the rotational axis.

While embodiments of the invention have been described in detail, it will be evident that the invention may be embodied otherwise without departing from the spirit and scope of the invention.

What is claimed is:

1. An apparatus for determining the shape of a surface of a distant object using picture element scanning, comprising:
    an optomechanical scanner for moving forward relative to the object surface, said scanner including:
    lens means for focusing radiation from said object;
    radiation detector means situated in a path of said radiation through said lens means;
    a rotatable optical element located between the object and said lens means for periodically swiveling a viewing direction of said radiation detector means transversely relative to the direction of relative movement between said scanner and the object, and for successively imaging surface elements of said object surface on said radiation detector means in the form of a plurality of successive scanning traces resulting from the periodic swiveling movement;
    said scanner being arranged for forming three sequences of the scanning traces with different perspective directions, one of the sequences being of middle scanning traces, another one of the sequences being of front scanning traces with a forward looking direction relative to movement of the scanner, and another one of the sequences being of back traces with a rearward looking direction relative to the movement of the scanner;
    an angle sensor for continuously measuring instantaneous rotational angles of said optical element; and
    means for synchronously recording, at presettable time intervals, the instantaneous rotational angles supplied by said angle sensor and the radiation values of the surface elements of the object surface measured by said radiation detector means and of the respective time intervals.

2. An apparatus according to claim 1, wherein said synchronous recording means includes:
    sample and hold means for sampling and holding the measured radiation values;
    digitized means connected to said sample and hold means and radiation value recorder means connected to said digitizing means;
    an angular position counter connected to said angle sensor;
    an angular position recorder means for said angular position counter; and
    an AND gate connecting said angular position recorder means to said angular position counter for passing signals in response to the time intervals.

3. An apparatus according to claim 2, wherein said synchronous recording means includes a clock and time generator having, connecting lines for transmitting synchronizing pulses from said clock and time generator to said sample and hold means and to said AND gate; and
    a time recorder for receiving signals in response to said synchronizing pulses from said clock and time generator.

4. An apparatus according to claim 3, wherein said synchronous recording means includes storage means for storing data, said storage means being connected with said clock and time generator and with, respectively, outputs of said radiation value recorder means, said angular position recorder means, and said time recorder; and
    connecting lines between said clock and time generator and, respectively, said angular position recorder means, said time recorder and said radiation value recorder means, said clock and time generator triggering the takeover of the data stored in said radiation value recorder means, said angular position recorder means, and said time recorder, and guiding the data to said storage means.

5. An apparatus according to any one of claims 1, 2, 3, and 4, wherein said scanner includes one rotatable optical element, three lenses for collecting light passing through said one rotatable optical element from three different directions, and three radiation detectors each situated, respectively, in the path of light through one of said lenses.

6. An apparatus according to claim 5, wherein said rotatable optical element includes a two-part or four-part rotating prism with a rotational axis which is oriented parallel to the direction of relative movement between the scanner and the object.

7. An apparatus according to claim 1, 2, 3 or 4, further comprising two additional scanners, said scanners having different perspectives, and additional elements including a further rotatable optical element, a further radiation detector, and a further lens between said further rotatable optical element and said further radiation detector.

8. An apparatus according to any one of claims 1, 2, 3, and 4, wherein said lens, means includes one lens and said radiation detector means includes one radiation detector, said rotatable optical element having means for executing swiveling movements of different perspectives successively in periodic repetition.

9. An apparatus according to claim 8, wherein said rotatable optical element is a reflecting prism having a rotational axis oriented parallel to the direction of relative movement between the scanner and the object, the reflecting prism comprising 3n (n>1, n=an integer) outer reflector surfaces, wherein of each three successive reflector surfaces, a surface normal of a middle one of said reflector surfaces is oriented perpendicularly relative to said rotational axis, and surface normals of the other two reflector surfaces are inclined with respect to said rotational axis in opposite directions.

* * * * *